UNITED STATES PATENT OFFICE.

JOHN G. KREMERS, OF MILWAUKEE, WISCONSIN.

PROCESS OF MAKING BARIUM OXID.

1,243,190.

Specification of Letters Patent. Patented Oct. 16, 1917.

No Drawing. Application filed December 6, 1915. Serial No. 65,226.

*To all whom it may concern:*

Be it known that I, JOHN G. KREMERS, a citizen of the United States, residing at Milwaukee, in the county of Milwaukee and State of Wisconsin, have invented a certain new and useful Improvement in Processes for Making Barium Oxid, of which the following is a full, clear, concise, and exact description.

My invention relates to the manufacture of barium oxid of such a physical and chemical nature which is suitable for transformation into a high grade marketable barium dioxid.

My invention concerns itself primarily with the provision of barium oxid from barium carbonate which is subjected to heat in the presence of carbon at atmospheric pressure. The resulting product barium oxid is on account of the steps utilized in my process of such a porous nature, having the right composition, that a short exposure to the air will cause the product to absorb oxygen so that ninety per cent. of the barium oxid is transformed into barium dioxid. Under higher than atmospheric pressure a product up to 93% dioxid is obtained. When passing pure oxygen instead of air over the oxid obtained by my process a product containing 96% dioxid and over is readily obtainable, showing the great porosity of the oxid, and hence its ability to absorb oxygen at correct temperatures. The various steps which are followed in the production of barium oxid make it possible thus to transform ninety per cent. and over thereof into barium dioxid without the hitherto consequent loss due to hydration or otherwise. Heretofore the processes converting barium carbonate to its oxid at atmospheric pressure have been unable to obtain a barium oxid which would yield a higher dioxid than from 45% to 60%.

I will explain more in detail the various steps which I follow in obtaining the above result. I provide primarily a closed retort having vent holes from which carbon monoxid may issue. A form of retort which has given me good results consists of a substantially cylindrical tube laid horizontally and closed at its farther extremity, and which is provided with a hinged door at its opposite or front extremity. Suitable means of applying heat externally to this retort are then provided, the temperature utilized of course being lower than the melting point of the oxid and being possibly in the neighborhood of 1250° C. The barium carbonate in powdered form is thoroughly mixed with a suitable form of carbon dust which may be in the form of lamp black, or otherwise. The carbon and barium carbonate are very thoroughly mixed together so that a uniform distribution is obtained, whereupon the mixture is compressed into regular or irregular forms, preferably, of cylindrical briquets. The briquets are then subjected to heat to drive off the moisture so that the briquets are thoroughly dry. Thereupon the briquets are fed into the retort, a little surplus carbon having first been introduced into the retort to create an atmosphere of carbon monoxid. This surplus carbon is also useful to reduce any carbon dioxid that may be present to carbon monoxid, thus preventing such carbon dioxid from reacting with the barium oxid subsequently formed. In this way there is preliminarily established in the retort an atmosphere which is substantially neutral or inert so far as concerns its effect on the briquets subsequently charged into the retort. The excess carbon monoxid issues from the holes provided in the door casing at the front extremity of the retort. It may be allowed to burn as it issues, or it may be conducted to reservoirs for subsequent use as fuel. The resulting product remaining in the retort at the conclusion of the heating operation is barium oxid, $BaO$. On account of the steps thus far followed, this product is exceedingly porous, and is withdrawn from the retort and is in condition for further treatment.

By the novel method herein described, it is possible to obtain barium oxid of such advantageous physical characteristics that a conversion of 90% or higher into dioxid is attainable upon heating in air under the proper conditions.

From what has been described the nature of my invention will be readily clear to those skilled in the art, and having thus described in general the various steps that are to be taken, what I claim as new and desire to secure by Letters Patent is:

1. The process of making barium oxid which comprises highly heating a suitable muffle chamber, introducing carbon into said chamber under such conditions as to create an atmosphere of carbon monoxid therein, then introducing into said chamber a mixture of barium carbonate and carbon, and continuing the heating to effect conversion of barium carbonate into barium oxid with production of carbon monoxid.

2. The process of making barium oxid which comprises first establishing an atmosphere of carbon monoxid in a heated muffle chamber, and then introducing into said chamber a mixture of barium carbonate and carbon, the temperature of the chamber being such as to effect conversion of barium carbonate into barium oxid with production of carbon monoxid.

3. The process of making barium oxid which comprises briqueting a mixture of barium carbonate and carbon, drying the briquets, introducing the dried briquets into a highly heated muffle chamber containing a substantial quantity of carbon monoxid, and continuing the heating to convert barium carbonate into barium oxid with production of more carbon monoxid.

4. The process of making barium oxid which comprises briqueting a mixture of barium carbonate and carbon, drying the briquets, and then heating the dried briquets in a muffle to a reacting temperature for production of barium oxid and carbon monoxid.

5. The process of making barium oxid which comprises drying a mixture of barium carbonate and carbon, and then heating the dried mixture in a muffle to effect conversion of barium carbonate into barium oxid with production of carbon monoxid.

6. The process of making barium oxid which comprises establishing a substantially inert or neutral atmosphere in a heated muffle, then charging into said muffle a mixture of barium carbonate and carbon, and continuing the heating to effect conversion of the barium carbonate into oxid.

7. The process of making barium oxid which comprises briqueting a mixture of barium carbonate and carbon, drying the briquets, establishing a substantially neutral or inert atmosphere in a heated muffle, then charging the dried briquets into the muffle, and continuing the heating to effect conversion of the barium carbonate into oxid.

In witness whereof, I hereunto subscribe my name this 3rd day of December, A. D. 1915.

JOHN G. KREMERS.

Witnesses:
JESSIE McCONIGHEN,
ANITA FABER.